US011308432B2

(12) United States Patent
Covell et al.

(10) Patent No.: US 11,308,432 B2
(45) Date of Patent: Apr. 19, 2022

(54) AUGMENTED REALITY VIRTUAL ORDER ASSISTANT

(71) Applicant: INTERNATIONAL BUSINESS MACHINES CORPORATION, Armonk, NY (US)

(72) Inventors: Jacob Thomas Covell, New York, NY (US); Clarissa Ho, New York, NY (US); Robert Huntington Grant, Marietta, GA (US); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 16/946,085

(22) Filed: Jun. 5, 2020

(65) Prior Publication Data

US 2021/0383302 A1    Dec. 9, 2021

(51) Int. Cl.
*G06Q 30/06*    (2012.01)
*G06Q 10/06*    (2012.01)
(Continued)

(52) U.S. Cl.
CPC ....... *G06Q 10/06316* (2013.01); *G06F 40/30* (2020.01); *G06N 5/04* (2013.01);
(Continued)

(58) Field of Classification Search
None
See application file for complete search history.

(56) References Cited

U.S. PATENT DOCUMENTS

| 8,145,854 | B1* | 3/2012 | Lee | ........... G06Q 10/06316 |
|           |     |        |     | 711/154 |
| 10,360,495 | B2 | 7/2019 | Chapela | |

(Continued)

FOREIGN PATENT DOCUMENTS

| CN | 103440603 A | 12/2013 |
| CN | 109523429   | 3/2019  |

(Continued)

OTHER PUBLICATIONS

Chang et al. (Yao-Jen Chang, Ya-Shu Kang, Po-Chiao Huang, An augmented reality (AR)-based vocational task prompting system for people with cognitive impairments, Research in Developmental Disabilities, vol. 34, Issue 10, 2013, pp. 3049-3056, ISSN 0891-4222).*

(Continued)

*Primary Examiner* — Matthew D Henry
(74) *Attorney, Agent, or Firm* — Schmeiser, Olsen & Watts; Stephanie Carusillo

(57) ABSTRACT

An approach is provided for generating an interface. Using natural language processing and natural language understanding, ingredients are derived from audio data from a customer's spoken order of ingredients of a food item. Locations of the ingredients in a preparation area are identified. A location of an employee is determined. Distances of the ingredient locations to the employee location are calculated. A sequence of selecting the ingredients is determined so that the employee selecting the ingredients in the sequence optimizes a speed at which the food item is prepared. An overlay to an interface for viewing in an augmented reality (AR) headset worn by the employee is generated and displayed. The overlay includes indicators overlaying an image of the preparation area. The indicators mark the ingredients, mark the sequence of selecting the (Continued)

ingredients, and distinguish the ingredients from other ingredients in the preparation area.

20 Claims, 5 Drawing Sheets

(51) Int. Cl.
| | |
|---|---|
| *G06Q 10/08* | (2012.01) |
| *G06Q 50/12* | (2012.01) |
| *G06N 20/00* | (2019.01) |
| *G06N 5/04* | (2006.01) |
| *G06F 40/30* | (2020.01) |
| *G06F 3/16* | (2006.01) |
| *G06V 20/00* | (2022.01) |
| *G06V 20/20* | (2022.01) |

(52) U.S. Cl.
CPC ....... *G06N 20/00* (2019.01); *G06Q 10/06311* (2013.01); *G06Q 10/087* (2013.01); *G06Q 30/0613* (2013.01); *G06Q 30/0633* (2013.01); *G06Q 30/0639* (2013.01); *G06Q 50/12* (2013.01); *G06F 3/167* (2013.01); *G06V 20/00* (2022.01); *G06V 20/20* (2022.01)

(56) References Cited

U.S. PATENT DOCUMENTS

| | | |
|---|---|---|
| 10,458,845 B2 | 10/2019 | Connor |
| 2015/0025671 A1* | 1/2015 | Assar .................. G06Q 10/063 |
| | | 700/117 |
| 2017/0323375 A1 | 11/2017 | Slater |
| 2017/0323640 A1* | 11/2017 | Sisodia ................. G06Q 30/06 |
| 2018/0300785 A1 | 10/2018 | Hurst |

FOREIGN PATENT DOCUMENTS

| | | | |
|---|---|---|---|
| JP | 2004054528 | 2/2004 | |
| WO | 2018165105 A1 | 9/2018 | |
| WO | WO-2019178372 A1 * | 9/2019 | ............. G06Q 10/10 |

OTHER PUBLICATIONS

Authors: Anonymous; Ttl: System and Method for Augmented-Reality-Optimized Task Management; Oct. 28, 2019; Database: IP.COM; IP.COM. No: IPCOM000260176D; 8 pages.

* cited by examiner

AUGMENTED REALITY VIRTUAL ORDER ASSISTANT

BACKGROUND

The present invention relates to managing ordering and preparation of restaurant food items, and more particularly to using augmented reality to identify ingredients being ordered for restaurant food items and determining a sequence of the identified ingredients to optimize food preparation.

There is a ubiquitous presence of fast casual restaurants that each serve hundreds of customers daily. Employees at fast casual restaurants are tasked with attempting to meet a quality standard while also trying to optimize an assembly line to reduce wait times, especially during peak hours and at popular locations.

Many fast-casual restaurants offer build to order meals. A build to order meal is prepared specifically when a customer requests the meal, so that the meal can be customized as desired by the customer. In some restaurants, a customer can direct an employee to select multiple ingredients for a build to order meal from a set of ingredients placed in a food preparation area that is visible to the customer.

SUMMARY

In one embodiment, the present invention provides a method generating an interface. The method includes using a natural language processing (NLP) module, a natural language understanding (NLU) module, and a database that associates ingredient names with pronunciations, keywords, and recipes, deriving, by one or more processors, ingredients of a food item from audio data. The audio data is received from a spoken order of a customer who is ordering the food item. The method further includes identifying, by the one or more processors, locations of the ingredients in a preparation area in the restaurant, the preparation area including (i) the ingredients included in the spoken order and (ii) other ingredients. The method further includes determining, by the one or more processors, a current location of an employee who is assigned to prepare the food item. The method further includes calculating, by the one or more processors, distances of the locations of the ingredients to the current location of the employee. The method further includes based on the calculated distances, determining, by the one or more processors, a sequence of selecting the ingredients, so that the employee selecting the ingredients in the sequence optimizes a speed at which the food item is prepared by the employee. The method further includes generating and displaying, by the one or more processors, an overlay to an interface for viewing in an augmented reality (AR) headset worn by the employee. The overlay includes visual indicators overlaying an image of the preparation area. The visual indicators mark the ingredients, mark the sequence of selecting the ingredients, and distinguish the ingredients from the other ingredients in the preparation area.

In another embodiment, the present invention provides a computer program product which includes one or more computer readable storage media having computer readable program code collectively stored on the one or more computer readable storage media. The computer readable program code is executed by a central processing unit (CPU) of a computer system to cause the computer system to perform a method analogous to the method summarized above.

In another embodiment, the present invention provides a computer system including a central processing unit (CPU); a memory coupled to the CPU; and one or more computer readable storage media coupled to the CPU. The one or more computer readable storage media collectively contain instructions that are executed by the CPU via the memory to implement a method analogous to the method summarized above.

DETAILED DESCRIPTION

Overview

When ordering food at restaurant (e.g., a fast casual restaurant) that allows the customer to customize the ingredients of a meal, the customer is exposed to the risk of receiving a meal that was not prepared exactly as ordered due to employee error (e.g., mishearing the order, not knowing the difference between the many ingredients, or using the wrong bowl in the assembly line). This problem of receiving an incorrectly prepared meal is especially likely to occur during busier times due the pressure to speed up orders and can expose the customer to dangers (e.g., a meal prepared with an incorrect ingredient is dangerous if the customer is allergic to that ingredient).

Embodiments of the present invention address the aforementioned unique challenges of the restaurant ordering experience by providing a learning-based system that utilizes natural language processing (NLP) and natural language understanding (NLU) to analyze audio data from a customer's order that specifies ingredients, compare the audio data against a menu item database, identify the location of ingredients relative to an employee who is preparing the customer's order, determine an optimal sequence of ingredient selection by the employee, and display real time augmented reality (AR) order selection markers, alerts, and instructions to assist the employee in preparing the customer's order.

Embodiments of the present invention provide a virtual order assistant in a restaurant that reduces human errors while simultaneously streamlining the ordering process, thereby allowing restaurants to cater to more customers in a given amount of time while still ensuring the accuracy of the orders served. Embodiments of the present invention provide an improvement in the restaurant ordering experience so that orders are analyzed and clearly defined in real time and employees can guarantee that customers are receiving their correct orders, thereby benefitting both parties as the employee is able to reduce manual touchpoints and speed up the process while the customers receive their orders quickly and accurately.

Embodiments of the present invention provide visual indicators in an overlay displayed to an employee wearing an AR headset to assist the employee in collecting ingredients and preparing a food item that includes the collected ingredients. Because the indicators are visual, the overlay facilitates quick and accurate food preparation by employees who are hearing impaired.

Embodiments of the present invention detect cross-contamination of ingredients within a food preparation area and display an alert about the cross-contamination in an overlay displayed to an employee wearing an AR headset, thereby allowing the employee to avoid accidentally including a cross-contaminated ingredient in a food item served to a customer who is allergic to the ingredient.

System for Generating an Interface

Figure 1:
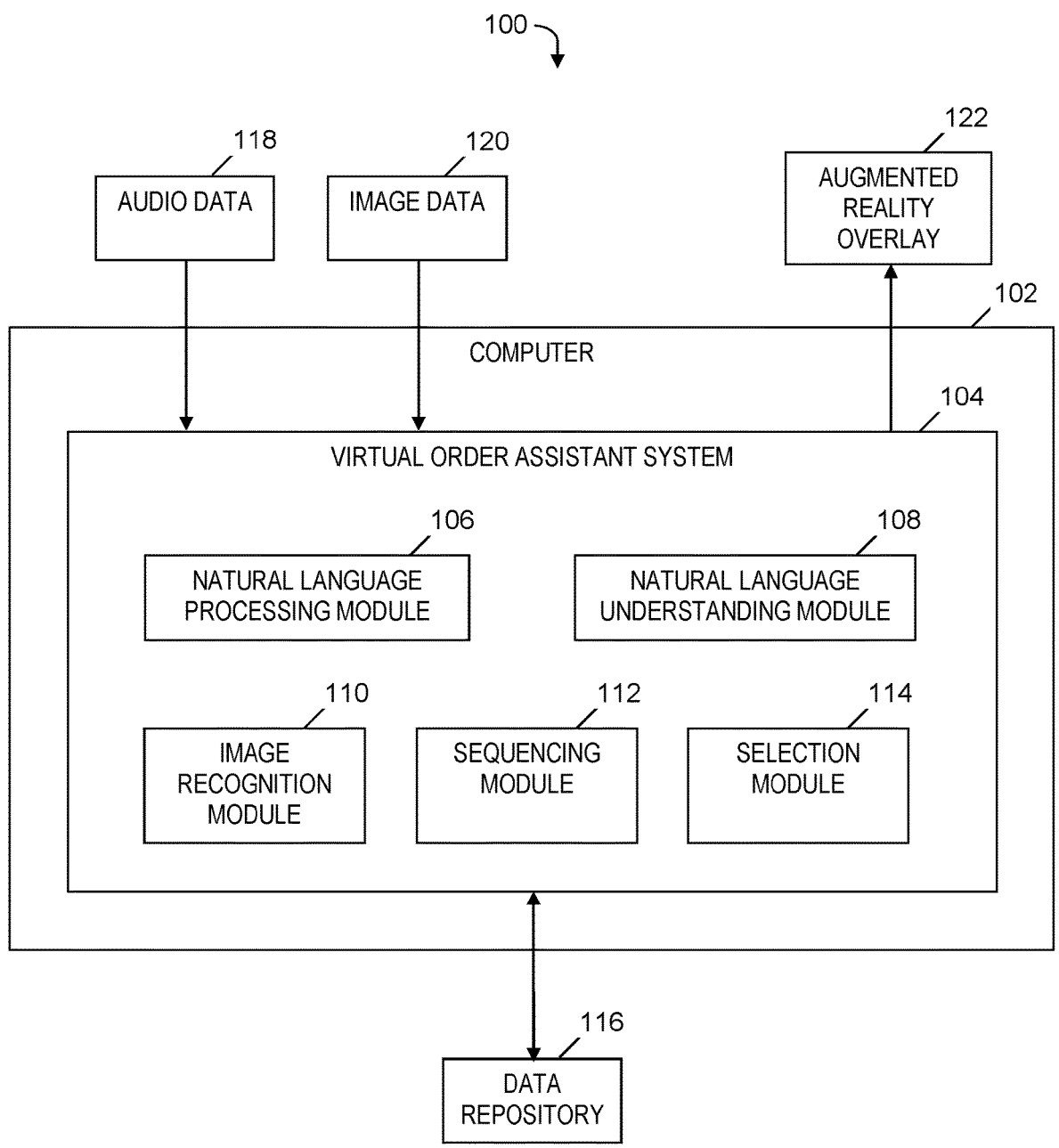
FIG. 1 is a block diagram of a system for generating an interface to assist a restaurant ordering process, in accordance with embodiments of the present invention.

FIG. 1 is a block diagram of a system 100 for generating an interface to assist a restaurant ordering process, in accordance with embodiments of the present invention. System 100 includes a computer 102, which executes a software-based virtual order assistant system 104, which includes a NLP module 106, a NLU module 108, an image recognition module 110, a sequencing module 112, and a selection module 114.

In a pre-processing phase, virtual order assistant system 104 receives and analyzes inputs to create a menu item database (not shown), which is stored in a data repository 116. In one embodiment, the inputs include names of ingredients (also referred to herein as "ingredient names") needed to prepare menu items of a restaurant, different pronunciations for a given ingredient, alternate keywords that are synonyms for a given ingredient, and collections of ingredients that make up respective recipes, orders, or food items on a menu of the restaurant. The different pronunciations include alternate pronunciations associated with one or more dialects.

Virtual order assistant system 104 is operatively coupled to one or more microphone(s) (not shown) that receive audio data 118 from a spoken order for a food item from a customer whose speech indicates multiple ingredients that an employee is directed to select from containers or sections in a preparation area and use to prepare the ordered food item.

NLP module 106 uses the menu item database stored in data repository 116 to analyze audio data 118 to define the order of the customer and derive the ingredients needed to prepare the order.

NLU module 108 uses keywords in the menu item database to compare to words in the customer's spoken order to further define the order and further derive the ingredients needed to prepare the order.

In one embodiment, the employee who is collecting the ingredients and preparing the food item ordered by the customer wears an AR headset (not shown) which includes computer 102 or is operatively coupled to computer 102. The AR headset is equipped with a front facing digital camera (not shown) or is operatively coupled to an external digital camera (not shown) mounted in the restaurant so that the field of view of the external camera includes the food preparation area (e.g., mounted about the food preparation area). In one embodiment, system 100 includes both a front facing camera in the AR headset worn by the employee and an external camera whose field of view includes the food preparation area. The front facing camera and/or the external camera generate image data 120. In one embodiment, the AR headset is equipped with one or more microphones configured to capture audio data 118.

Image recognition module 110 receives image data 120 from the front facing camera and/or external camera and further receives the defined order and derived ingredients from NLP module 106 and NLU module 108. Image recognition module 110 identifies the location of each ingredient of the customer's order in the food preparation area. Image recognition module 110 also determines the current location of the employee who is assigned to prepare the customer's order and determines the distances from the current location of the employee to respective ingredients of the customer's order in the food preparation area.

Sequencing module 112 uses the locations and distances identified and determined by the image recognition module 110 to determine an optimal route and sequence for collecting the ingredients to prepare the food item ordered by the customer. As used herein, a route is defined as the path traveled by the employee, the employee's hands, or tool(s) manipulated by the employee to collect the ingredients for the customer's order. The sequence is the order in which the ingredients are collected by the employee. In one embodiment, sequencing module 112 optimizes the route and sequence by determining the route and sequence that provides the fastest preparation of the customer's order.

Selection module 114 generates and displays AR overlay 122, which is an overlay of the interface presented to the employee via the AR headset. The overlay includes visual indicators that specify which ingredients in the food preparation area need to be collected for the customer's order and also specify the optimal route and sequence to collect the ingredients. The visual indictors may provide highlighting, outlining, colors, symbols, and/or other graphical elements to focus the attention of the employee only on the ingredients that are needed to prepare the customer's order. The visual indicators may include arrows or other graphical elements indicating direction to specify the optimal route and sequence for collecting the ingredients. The overlay acts as a virtual assistant to the employee by helping the employee collect the ingredients and prepare the food item for the customer accurately and quickly.

In one embodiment, NLP module 106 and NLU module 108 analyze the spoken order to identify one or more customized portion sizes of one or more ingredients included in the customer's order. The overlay generated and displayed by selection module 114 can also include visual indicators of the one or more customized portion sizes. For example, the customer's spoken order may specify that the customer wants only a small portion of onions. In this case, the AR overlay 122 includes a visual indicator "S" which indicates "small portion" and which overlays the container of onions in the food preparation area shown in the interface of the AR headset. The visual indicator(s) specifying portion size(s) also assist the employee in collecting the ingredients and preparing the food item accurately.

Virtual order assistant system 104 monitors and analyzes interactions between the customer and the employee to identify mistake(s) made in the preparation of the food item and remedial action(s) taken to correct the mistake(s). Virtual order assistant system 104 analyzes the mistake(s), remedial action(s), and the ordering process to determine whether a miscommunication between the customer and the employee was a reason for the mistake(s). If there was a miscommunication, virtual order assistant system 104 determines a source of the miscommunication (e.g., the customer used an alternate name for an ingredient where the alternate name was not already in the menu item database or the customer had a regional accent that provided a pronunciation of the name of the ingredient that could not be matched to the pronunciations already stored in the menu item database). Virtual order assistant system 104 stores the source of the miscommunication in data repository 116 and a machine learning component (not shown) of virtual order assistant system 104 uses the stored source of the miscommunication as feedback to a learning algorithm that provides data to the menu item database, image recognition module 110, sequencing module 112, and/or selection module 114 so that future orders that have a similar customer-employee interaction can avoid the mistake(s) and be processed into accurately prepared food items.

The monitoring and analysis of the interactions between the customer and the employee can result in virtual order assistant system 104 identifying no mistake and no remedial action. In this case, virtual order assistant system 104 stores indicators of positive reinforcement in data repository 116. The machine learning component uses the stored indicators of positive reinforcement to strengthen the confidence of processing future similar orders with the same actions that were taken to identify the ingredients for the current order.

The functionality of the components shown in FIG. 1 is described in more detail in the discussion of FIGS. 2A-2B, FIG. 3, and FIG. 4 presented below.

Process for Generating an Interface

Figure 2A:
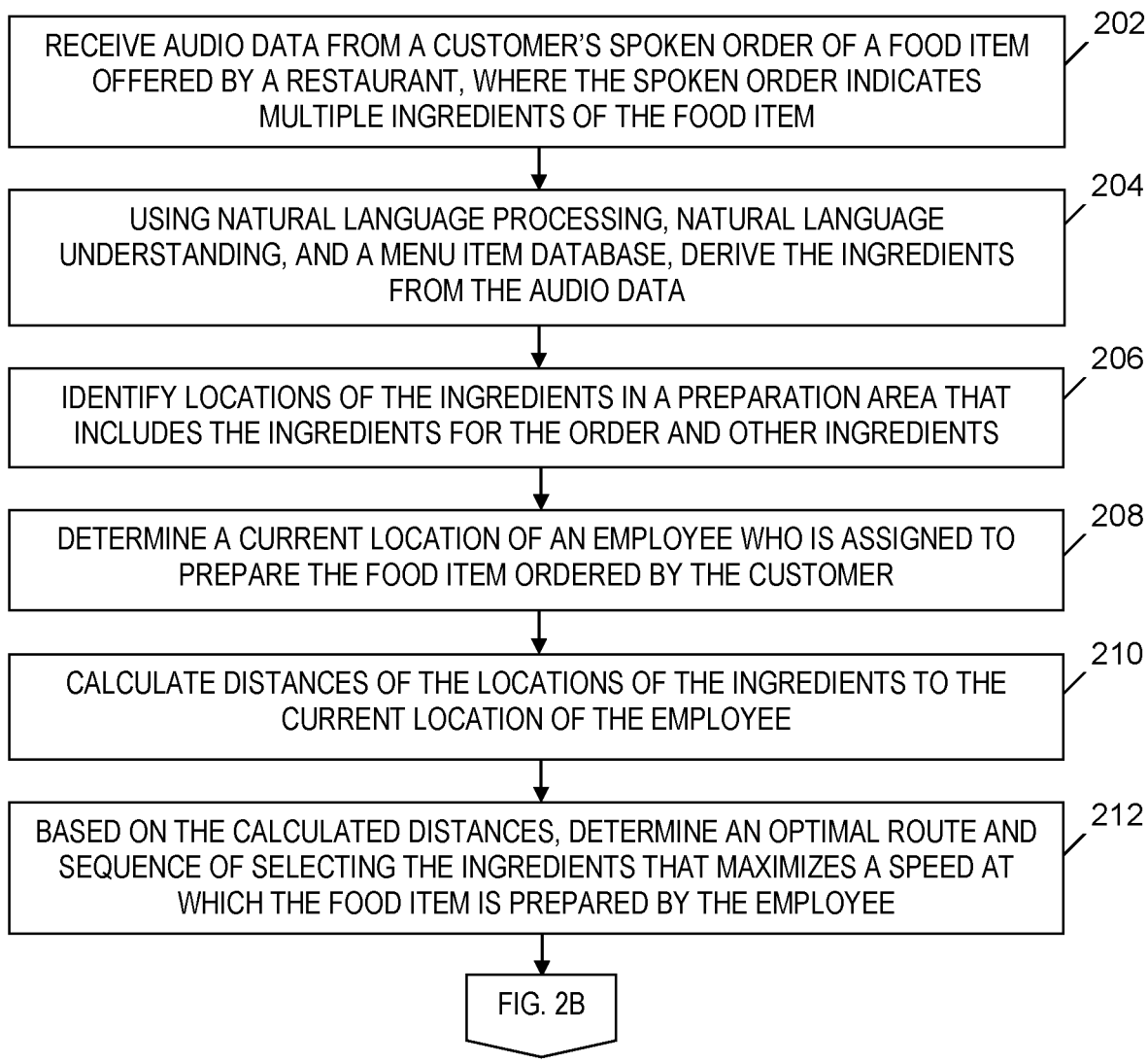
FIGS. 2A-2B depict a flowchart of a process of generating an interface to assist a restaurant ordering process, where the process is implemented in the system of FIG. 1, in accordance with embodiments of the present invention.
Figure 2B:
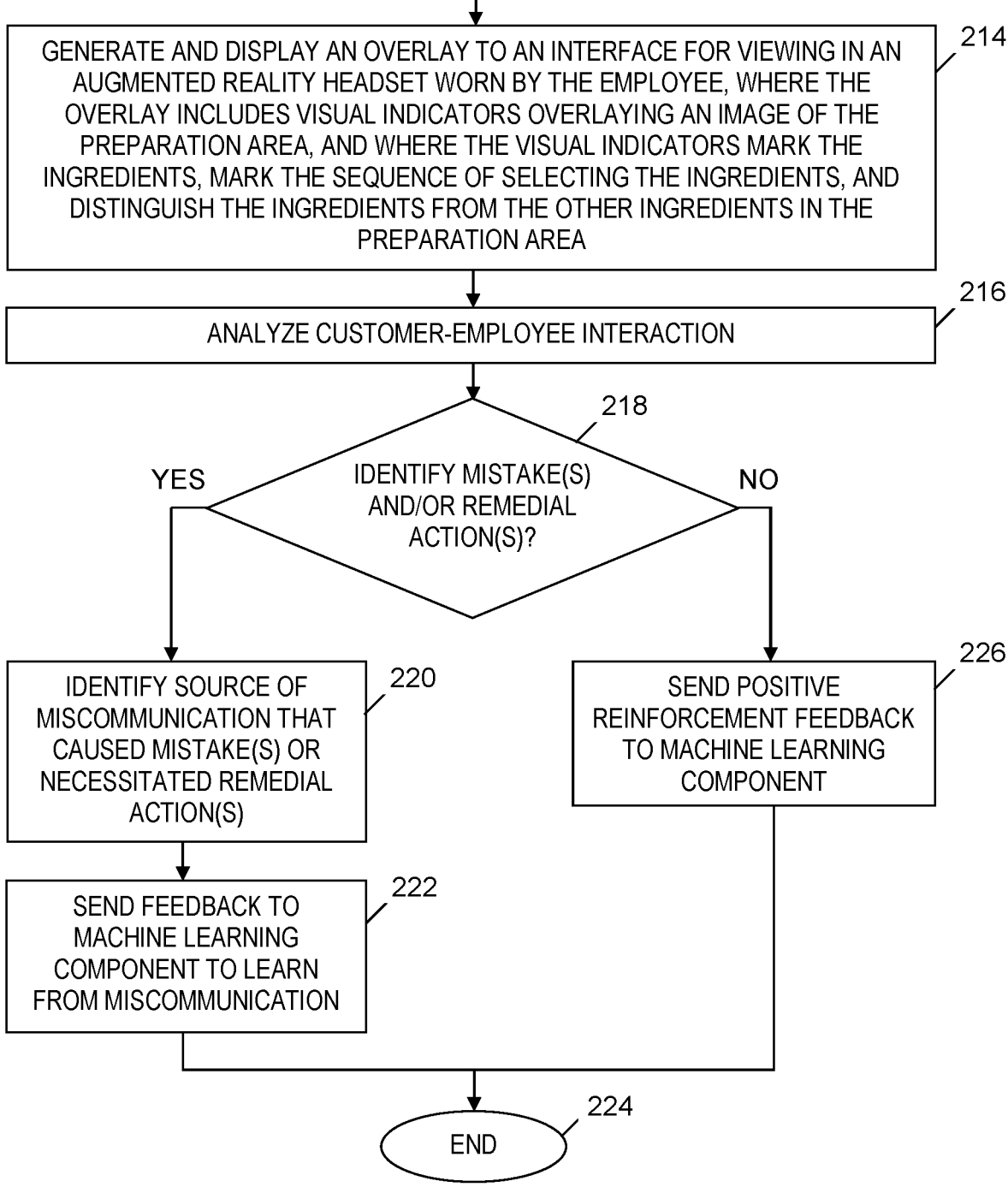

FIGS. 2A-2B depict a flowchart of a process of generating an interface to assist a restaurant ordering process, where the process is implemented in the system of FIG. 1, in accordance with embodiments of the present invention. The process of FIGS. 2A-2B starts at step 202 in FIG. 2A. Prior to step 202, virtual order assistant system 104 receives and analyzes inputs (e.g., ingredient names, pronunciations of the ingredients, alternate keywords that indicate the ingredients, and collections of ingredients per recipe or order) and uses the inputs to create the menu item database. After ingredients are prepared in the restaurant and placed into bowls or other containers within the food preparation area, the camera included in the AR headset or the external camera feeds image data 120 (i.e., an image of the food preparation area) into image recognition module 110, which identifies the ingredients in the containers in the food preparation area and matches the identified ingredients to ingredients in the menu item database. Alternately, the ingredients are configured in the food preparation area in a fixed grid pattern that is known to virtual order assistant system 104.

In step 202, virtual order assistant system 104 receives audio data 118 from a customer's spoken order (i.e., voice query) of a food item to be prepared at a restaurant. In one embodiment, the food item is a build to order bowl, dish or meal offered by a restaurant. In another embodiment, the food item is an item on the menu of the restaurant. In one embodiment, the spoken order indicates multiple ingredients of the food item. In one embodiment, one or more microphones receive capture audio data 118 from the customer's spoken order. The one or more microphones are included in or operatively coupled to an AR headset worn by an employee of the restaurant, where the employee is assigned to prepare the food item ordered by the customer.

In an alternate embodiment, the customer provides a virtual order of the food item instead of a spoken order.

In step 204, using natural language processing provided by NLP module 106, natural language understanding provided by NLU module 108, and a menu item database, virtual order assistant system 104 derives the ingredients from an analysis of audio data 118. The menu item database includes names of ingredients, pronunciations and keywords that specify a given ingredient, and ingredients that are needed for a given recipe, order, or food item.

In one embodiment, in step 204, NLP module 106 uses a string similarity algorithm or another fast fuzzy matching algorithm to search the menu item database to find all possible matching ingredients based on ingredient names, pronunciations, and/or dialect of the customer derived from the analysis of audio data 118 that uses voice-to-text translation. In one embodiment, NLU module 108 uses a NLU technique to consider keywords derived from audio data 118 that are associated with an ingredient in the menu item database.

In one embodiment, virtual order assistant system 104 derives the ingredients in step 204 by also incorporating image data 120 that indicates gestures of the customer during the ordering process. For example, virtual order assistant system 104 determines that audio data 118 is ambiguous regarding whether the customer wants Ingredient A to be included in the food item, but virtual order assistant system 104 derives Ingredient A in step 204 based on image data 120 that includes an image of the customer pointing at Ingredient A.

In one embodiment, virtual order assistant system 104 identifies the customer, associates the identified customer with a user profile, and utilizes historic patterns of the customer's previous orders to increase the accuracy of the ingredients derived in step 204.

In one embodiment, if results of a search of the menu item database to find ingredients that match audio data 118 are ambiguous, virtual order assistant system 104 uses an accent and dialect classifier module (not shown in FIG. 1) to refine the ingredient search and eliminate the ambiguity.

In step 206, image recognition module 110 identifies locations of the ingredients derived in step 204, where the locations are positions of the ingredients in a food preparation area of the restaurant. The food preparation area includes a collection of ingredients needed to prepare multiple food items offered by the restaurant, where the collection of ingredients includes the ingredients needed for the customer's order and other ingredients. Image recognition module 110 identifies the aforementioned locations by analyzing image data 120 provided by a digital camera mounted on the AR headset worn by the employee who is assigned to prepare the food item ordered by the customer or from an external camera whose field of view includes the food preparation area.

In step 208, image recognition module 110 determines a current location of the employee assigned to prepare the food item ordered by the customer.

In step 210, image recognition module 110 calculates distances of the locations of the ingredients identified in step 206 to the current location of the employee determined in step 208.

In step 212, based on the distances calculated in step 210, sequencing module 112 determines a route and sequence of selecting the ingredients derived in step 204. Virtual order assistant system 104 determines a route and a sequence of selecting the ingredients to prepare the food item ordered by the customer. In one embodiment, the determination in step 212 includes determining an optimal route and optimal sequence of selecting the ingredients, where optimizing the route and sequence includes maximizing the speed of collecting the ingredients and preparing the food item ordered by the customer. In one embodiment, sequencing module 112 uses Dijkstra's algorithm to determine the optimal route for selecting the ingredients to prepare the food item.

In one embodiment, sequencing module 112 may use other factors to determine the route and sequence. One factor may include a predetermined order in which ingredients are to be added to the bowl. Another factor may include when ingredients are ready to be served. If an ingredient is not currently stocked in the food preparation area because the preparation of the ingredient is not completed, then the determination of the order and sequence is based on data from sensors that gauge the progress of the preparation of the ingredient. Yet another factor is the location(s) and the food preparation route(s) of one or more other employees, which can be considered to reduce the crossing of paths of the employees as they prepare food items.

After step 212, the process continues with step 214 in FIG. 2B. In step 214, selection module 114 generates and displays AR overlay 122 as an overlay to an interface for viewing in an AR headset worn by the employee assigned to preparing the food item ordered by the customer. AR overlay 122 includes visual indicators overlaying an image of the food preparation area captured by a digital camera mounted on the AR headset or by an external digital camera whose field of view includes the food preparation area. The visual indicators mark the ingredients derived in step 204 (see FIG. 2A), mark the sequence of selecting the ingredients derived in step 204 (see FIG. 2A), and distinguish the ingredients derived in step 204 (see FIG. 2A) from the other ingredients in the food preparation area. For example, if Ingredient A is derived in step 204, then AR overlay 122 includes a highlighting mark that overlays the image of the container in the food preparation area that includes Ingredient A.

In step 216, virtual order assistant system 104 analyzes an interaction between the customer and the employee by using audio data 118 and image data 120 that describes a verbal and/or non-verbal exchange between the customer and the employee after AR overlay 122 was displayed in step 214. In one embodiment, step 216 is performed after the employee serves the prepared food item to the customer.

In step 218, based on the analysis of the interaction in step 216, virtual order assistant system 104 either (i) identifies mistake(s) and/or remedial action(s) taken in response to a miscommunication between the customer and the employee or (ii) identifies no mistake and no remedial action. If virtual order assistant system 104 in step 218 identifies the aforementioned mistake(s) and/or remedial action(s), then the Yes branch of step 218 is taken and step 220 is performed.

In step 220, virtual order assistant system 104 identifies the source of miscommunication that caused the mistake(s) and/or necessitated the remedial action(s).

In step 222, virtual order assistant system 104 sends feedback about the identified source of miscommunication to a machine learning component of virtual order assistant system 104 to learn from the feedback and improve the accuracy of processing future orders that match or are similar to the order being processed. In one embodiment, virtual order assistant system 104 sends the feedback to one or more modules associated with the mistake(s). The one or more modules are a combination of: NLP module 106, NLU module 108, image recognition module 110, sequencing module 112, and selection module 114 for self-improvement.

For example, if the source of miscommunication was a particular dialect D with a specific pronunciation of Ingredient A that NLP module 106 had difficulty interpreting, then the machine learning component can learn from the miscommunication by associating Ingredient A with the specific pronunciation of Ingredient A using the dialect D.

As another example, the employee asks the customer "Did I forget anything?" The virtual order assistant system 104 records the customer's response that specifies ingredients that were missing from the original order's voice-to-text translation in step 204.

As still another example, the customer says "No, not quinoa, I wanted lentils" to indicate that one desired ingredient had been inadvertently substituted with a similar-looking ingredient. The machine learning component learns from the mistake of the inadvertent substitution and alerts the employee to the similar-looking ingredients by displaying a notification in AR overlay 122 in response to processing future similar orders.

After step 222, the process of FIGS. 2A-2B ends at an end node 224.

Returning to step 218, if virtual order assistant system 104 identifies no mistake and no remedial action, then the No branch of step 218 is taken and step 226 is performed.

In step 226, virtual order assistant system 104 sends the positive reinforcement feedback to the machine learning component to learn from the feedback and ensure the accuracy of the processing of future orders that match or are similar to the order being processed.

Following step 226, the process of FIGS. 2A-2B ends at end node 224.

In one embodiment, virtual order assistant system 104 identifies adjectives and phrases used in the customer's spoken order that describe a specific portion size being requested for a given ingredient or provide special instructions for the preparation of the food item. Virtual order assistant system 104 displays a notification or symbol in the AR overlay 122 to indicate the requested portion size for a particular ingredient. In one embodiment, the aforementioned notification or symbol of the portion size of an ingredient overlays a portion of the image of the food preparation area displayed in the interface of the AR headset, where the portion of the image displays the ingredient or displays the container that is assigned to hold the ingredient. For example, the customer requests a "small amount of tomatoes" and the virtual order assistant system 104 generates AR overlay 122 in step 214 to include a letter "S" overlaying the tomatoes displayed in the interface of the AR headset, where the letter "S" is a symbol indicating to the employee to select a small portion of the overlaid ingredient.

In one embodiment, virtual order assistant system 104 collects the routes and sequences determined in step 212 (see FIG. 2A) for multiple customers over a period of time to determine patterns of customer ingredient selections. Based on the patterns of customer ingredient selections, virtual order assistant system 104 determines a rearrangement of the ingredients in the food preparation area to increase the efficiency of preparing food items for future orders.

In one embodiment, virtual order assistant system 104 uses patterns of customer ingredient selections or analyses of recipes by a cognitive computing application (e.g., Chef Watson) to provide notifications or graphical elements in the AR overlay 122 that indicate one or more additional ingredients that the employee is directed to suggest to the customer as possible additions to the ingredients already stated by the customer. The one or more additional ingredients added to the ingredients already ordered by the customer creates a combination that is likely to be pleasing to a sizable number of people based on how common the combination is in the patterns of customer ingredient selections or in the recipes analyzed by the cognitive computing application.

In one embodiment, virtual order assistant system 104 includes an emotion recognition module (not shown). The emotion recognition module identifies and analyzes emotional reactions of the customer in response to specific actions associated with the preparation of the food item by the employee. Based on the analyzed emotional reactions, the emotion recognition module provides real-time suggestions or alerts to the employee via the AR overlay 122 to modify the preparation of the food item. For example, the emotion recognition module identifies distress as an emotional reaction of the customer to the employee adding a small portion of chicken. The emotion recognition module provides an alert of "give more chicken" that is included in the AR overlay 122 for viewing by the employee.

In one embodiment, image recognition module 110 analyzes image data 120 to determine if the food preparation process has caused cross-contamination to occur in one or more sub-areas in the food preparation area. Cross-contamination occurs when one ingredient from one container in the food preparation area has been moved to be in another container or in contact with another container in the food preparation area. For example, an employee preparing a food item that includes tomatoes may pick up tomatoes from a first container in the food preparation area to deposit them in a bowl, but before reaching the bowl, may drop one piece of tomato in another container in the food preparation area. In response to the image recognition module 110 detecting the cross-contamination, virtual order assistant system 104 generates and places a notification about the cross-contamination in AR overlay 122 for viewing by the employee. By being notified about the cross-contamination, the employee can eliminate or avoid the cross-contamination and can avoid accidentally collecting a cross-contaminated ingredient during the preparation of a food item for a customer who is allergic to the cross-contaminated ingredient.

In one embodiment, virtual order assistant system 104 identifies the customer and accesses a user profile of the customer that specifies food allergies of the customer. Using the food allergies specified in the user profile, virtual order assistant system 104 includes a notification about the food allergies in AR overlay 122, or otherwise includes an indicator that the customer is allergic to one or more ingredients in the food preparation area. By viewing the notification or indicator about the food allergies in AR overlay 122, the employee avoids collecting or having preparation tools come into contact with the ingredients to which the customer is allergic, thereby preventing an allergic reaction by the customer.

Example of Using the Virtual Order Assistant System

As one example, Tara works at a fast-casual restaurant that serves bowls to hundreds of customers each day. During peak hours, Tara prepares up to five bowls per minute. Without using system 100 and the process of FIGS. 2A-2B, Tara makes mistakes while preparing bowls because there is pressure on the employees to minimize customer wait times and accelerate order delivery.

In a pre-processing phase, virtual order assistant system 104 (see FIG. 1) utilizes data including ingredients and recipes to create a menu item database.

During processing of spoken orders for food items, virtual order assistant system 104 (see FIG. 1) uses the menu item database as a reference to match against during an analysis of the spoken orders. Microphone capabilities embedded in an AR headset worn by Tara captures audio data 118 (see FIG. 1) from the customer's spoken order. Virtual order assistant system 104 (see FIG. 1) sends the audio data 118 (see FIG. 1) to NLP module 106 and NLU module 108, which use audio data 118 (see FIG. 1) to interpret the customer's order (i.e., derive the ingredients in the spoken order) in step 204 (see FIG. 2A). For instance, in step 204 (see FIG. 2A), virtual order assistant system 104 (see FIG. 1) derives Ingredient 1, Ingredient 2, Ingredient 3, and Ingredient 4 as being the needed ingredients to prepare the customer's order.

Once the order is interpreted, a camera connected to the AR headset captures image data 120 (see FIG. 1) and sends the image data 120 (see FIG. 1) to image recognition module 110 (see FIG. 1). From the derivation of the ingredients from the audio data 118 (see FIG. 1), virtual order assistant system 104 (see FIG. 1) has knowledge of the ingredients that are needed to process the customer's order and image recognition module 110 (see FIG. 1) uses image data 120 (see FIG. 1) in step 206 (see FIG. 2A) to locate each of the needed ingredients in the food preparation area. Image recognition module 110 (see FIG. 1) also determines the current location of Tara in step 208 (see FIG. 2A) and calculates the distances of each of the needed ingredients to Tara's current location in step 210 (see FIG. 2A).

For instance, in step 210 (see FIG. 2A), image recognition module 110 (see FIG. 1) calculates the distances as follows:
Ingredient 1 to Tara: 1 foot
Ingredient 2 to Tara: 4 feet
Ingredient 3 to Tara: 2 feet
Ingredient 4 to Tara: 1 foot Based on the data produced by the image recognition module 110 (see FIG. 1) regarding the locations of the needed ingredients and the distances between each of the ingredients and Tara's current location, sequencing module 112 (see FIG. 1) in step 212 (see FIG. 2A) calculates the optimal route for preparing the food item being ordered by the customer.

For instance, sequencing module 112 (see FIG. 1) determines the optimal route as selecting Ingredients 1 and 4 first, then selecting Ingredient 3, and then selecting Ingredient 2, where the route is based on the distances between ingredients and Tara (i.e., shortest distance to longest distance indicates the sequence in the optimal route).

In step 214, selection module 114 (see FIG. 1) displays AR overlay 122 (see FIG. 1) that overlays an image of the food preparation area that has annotations and highlights to guide the employee in real-time to the derived ingredients in the sequence specified by the optimal route. Other indicators in AR overlay 122 (see FIG. 1) guide the employee to collect one or more of the ingredients in customized portion sizes specified by the customer.

After serving the customer with the prepared food item, virtual order assistant system 104 (see FIG. 1) monitors the customer's response and feedback in step 216 (see FIG. 2B). virtual order assistant system 104 (see FIG. 1) uses the customer's response and feedback to determine whether a mistake was made in the preparation of the order or whether a remedial action was taken. If a mistake or remedial action was identified in step 218 (see FIG. 2B), virtual order assistant system 104 (see FIG. 1) uses the identification of the mistake or remedial action to provide self-improvement of the processing of future orders. If no mistake and no remedial action were identified in step 218 (see FIG. 2B), then virtual order assistant system 104 (see FIG. 1) stores the information about the order being accurately prepared, where the information can be referenced for future orders.

Overlay Example

Figure 3:
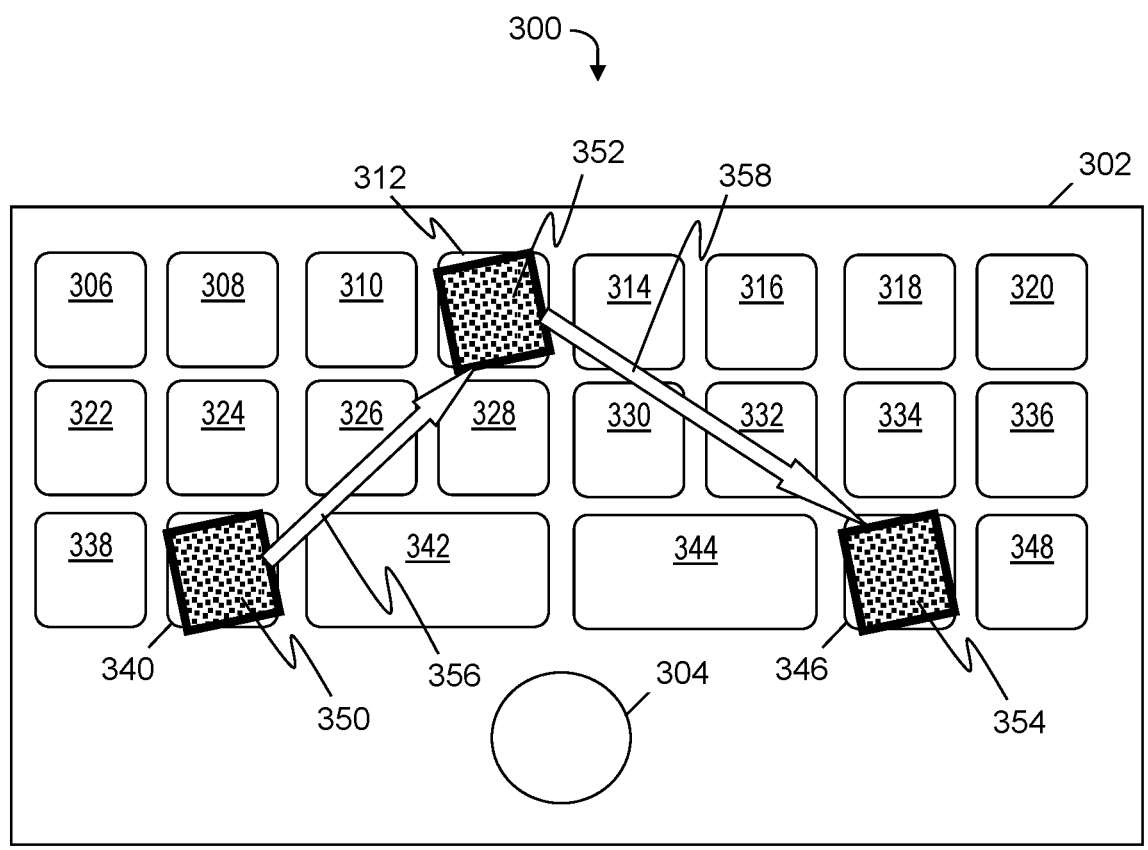
FIG. 3 is an example of an overlay generated in the process of FIGS. 2A-2B, in accordance with embodiments of the present invention.

FIG. 3 is an example of an AR overlay 122 (see FIG. 1) generated in the process of FIGS. 2A-2B, in accordance with embodiments of the present invention. Example 300 includes an interface 302 that is displayed by the AR headset for viewing by the employee who is wearing the AR headset and preparing the food item ordered by the customer. Interface 302 includes an image of a food preparation area of a restaurant that includes a bowl 304 being prepared by the employee and a collection of ingredients 306, 308, 310, 312, 314, 316, 318, 320, 322, 324, 326, 328, 330, 332, 334, 336, 338, 340, 342, 344, 346, and 348.

In example 300, AR overlay 122 (see FIG. 1) consists of a first outlined and highlighted area 350 that overlays ingredient 340, a second outlined and highlighted area 352 that overlays ingredient 312, a third outlined and highlighted area 354 that overlays ingredient 346, a first arrow 356 that starts at area 350 and points to area 352, and a second arrow 358 that starts at area 352 and points to area 354. The graphical elements that comprise areas 350, 352, and 354 have sufficient transparency to allow the employee to see through areas 350, 352, and 354 and be able to see ingredients 340, 312, and 346, respectively, in interface 302.

The outlined and highlighted areas 350, 352, and 354 indicate that the customer's order requires the ingredients that are visible under the outlined and highlighted areas (i.e., ingredients, 340, 312, and 346, respectively, which are the ingredients derived in step 204 in FIG. 2A). The arrows 356 and 358 together with the outlined and highlighted areas 350, 352, and 354 indicate the route and sequence of selecting the ingredients to maximize the speed of preparing the order, where the route and sequence are determined in step 212 (see FIG. 2A).

Computer System

Figure 4:
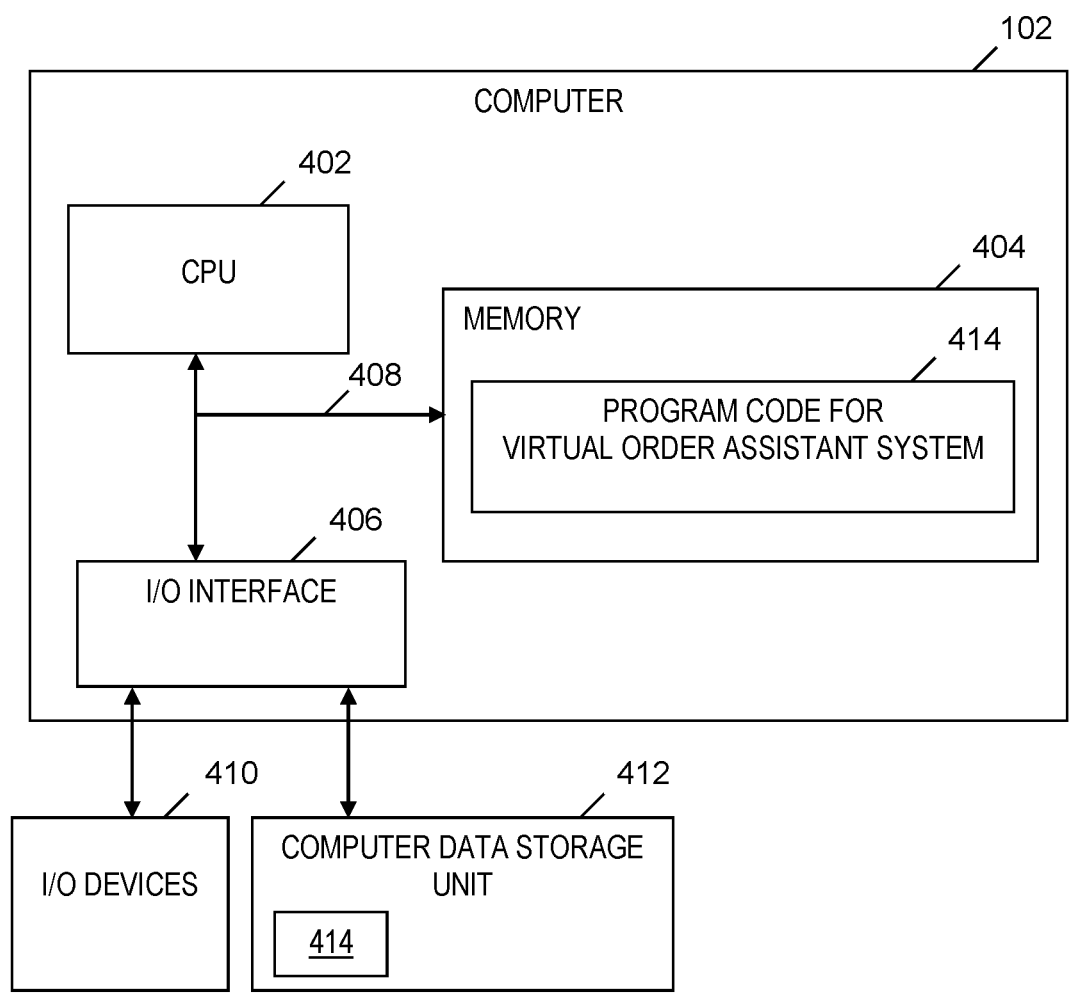
FIG. 4 is a block diagram of a computer included in the system of FIG. 1 and that implements the process of FIGS. 2A-2B, in accordance with embodiments of the present invention.

FIG. 4 is a block diagram of a computer included in the system of FIG. 1 and that implements the process of FIGS. 2A-2B, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for virtual order assistant system 104 (see FIG. 1) to perform a method of generating an interface to assist a restaurant ordering process, where the instructions are executed by CPU 402 via memory 404. CPU 402 may include a single processing unit or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer readable storage medium, which is described below. In one embodiment, computer data storage unit 412 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 404 and/or storage unit 412 may store computer program code 414 that includes instructions that are executed by CPU 402 via memory 404 to generate an interface to assist a restaurant ordering process. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

In one embodiment, computer data storage unit 412 includes data repository 116 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to generating an interface to assist a restaurant ordering process. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to generate an interface to assist a restaurant ordering process. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of generating an interface to assist a restaurant ordering process.

While it is understood that program code 414 for generating an interface to assist a restaurant ordering process may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of generating an interface to assist a restaurant ordering process. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of generating an interface, the method comprising:
   using a natural language processing (NLP) module, a natural language understanding (NLU) module, and one or more microphones operatively coupled to the NLP and NLU modules, and using a database that associates ingredient names with pronunciations, keywords, and recipes, deriving, by one or more processors, ingredients of a first food item from first audio data captured by the one or more microphones and received from a first spoken order of a first customer who is ordering the first food item;
   determining, by the one or more processors, that the first audio data includes a pronunciation of a first ingredient that is not included in the derived ingredients of the first food item and is not associated with the pronunciations associated with ingredient names by the database;
   using a machine learning component and a dialect of the first customer, learning, by the one or more processors, that the pronunciation of the first ingredient is associated with the first ingredient, and associating, in the database, and by the one or more processors, the pronunciation of the first ingredient with a name of the first ingredient;
   subsequent to the learning using the machine learning component, receiving, by the one or more processors, second audio data from a second spoken order of a second customer who is ordering a second food item, the second audio data being captured by the one or more microphones;
   using the NLP module and the NLU module, determining, by the one or more processors, that the second audio data includes the pronunciation of the first ingredient;
   using the NLP module, the NLU module, and the database, deriving, by the one or more processors, ingredients of the second food item from the second audio data, wherein the deriving the ingredients includes deriving the first ingredient from the second audio data based on the database associating the pronunciation of the first ingredient with the name of the first ingredient;
   using a camera, identifying, by the one or more processors, locations of the ingredients of the second food item in a preparation area, the preparation area including (i) the ingredients of the second food item and (ii) other ingredients, the camera being operatively coupled to an augmented reality (AR) headset worn by a second employee who is assigned to prepare the second food item;
   using image data captured by the camera, determining, by the one or more processors, a current location of the second employee;
   calculating, by the one or more processors, distances of the locations of the ingredients of the second food item to the current location of the second employee;
   based on the calculated distances, determining, by the one or more processors, a sequence of selecting the ingredients of the second food item, so that the second employee selecting the ingredients of the second food item in the sequence maximizes a speed at which the second food item is prepared by the second employee; and
   generating and displaying, by the one or more processors, an overlay to an interface for viewing in the AR headset worn by the second employee, the overlay including visual indicators overlaying an image of the preparation area, the visual indicators marking the ingredients of the second food item and the sequence of selecting the ingredients of the second food item, and distinguishing the ingredients of the second food item from the other ingredients in the preparation area.

2. The method of claim 1, wherein the identifying the locations of the ingredients of the second food item in the preparation area includes identifying the ingredients of the second food item in the locations by using an image recognition module analyzing image data captured by a digital camera whose field of view includes the preparation area.

3. The method of claim 1, further comprising determining, by the one or more processors, positions of the ingredients of the second food item in a fixed grid pattern that specifies locations of a set of ingredients in the preparation area, wherein the identifying the locations of the ingredients of the second food item in the preparation area is based on the positions of the ingredients of the second food item in the fixed grid pattern.

4. The method of claim 1, further comprising using the NLP and NLU modules, deriving, by the one or more processors, a portion size of an ingredient included in the second spoken order, wherein the overlay further includes a visual indicator of the portion size that overlays a portion of the image that displays the ingredient.

5. The method of claim 1, further comprising:
   subsequent to the second employee completing a preparation of the second food item after the overlay is generated, receiving, by the one or more processors, additional audio data from additional speech in an interaction between the second customer and the second employee, the additional speech indicating a mistake in the completed preparation of the second food item;

monitoring, by the one or more processors, a remedial action taken by the second employee to correct the mistake;

based on the mistake and the remedial action, identifying, by the one or more processors, a source of a miscommunication between the second customer and the second employee that caused the mistake; and sending, by the one or more processors, feedback about the source of miscommunication to the machine learning component to learn from the feedback and improve an accuracy of processing a future spoken order for another food item by avoiding the miscommunication in processing the future spoken order.

6. The method of claim 1, further comprising classifying an accent or a dialect detected in the second audio data by using an accent and dialect classifier module, wherein the deriving the ingredients of the second food item from the second audio data is based on the accent or the dialect detected in the second audio data.

7. The method of claim 1, wherein the deriving the ingredients of the second food item includes:

searching through the database and in response to the searching, finding a plurality of ingredients stored in the database that are tentative matches to an ingredient included in the second spoken order; and using a string similarity algorithm, selecting one of the ingredients in the plurality of ingredients as being a final match to the ingredient included in the second spoken order.

8. The method of claim 1, further comprising:

providing at least one support service for at least one of creating, integrating, hosting, maintaining, and deploying computer readable program code in the computer, the program code being executed by a processor of a computer to implement the deriving the ingredients of the first food item from the first audio data, the determining that the first audio data includes the pronunciation of the first ingredient, the learning that the pronunciation of the first ingredient is associated with the first ingredient, the associating the pronunciation of the first ingredient with the name of the first ingredient, the receiving the second audio data, the determining that the second audio data includes the pronunciation of the first ingredient, the deriving the ingredients of the second food item from the second audio data, the identifying the locations of the ingredients of the second food item, the determining the current location of the second employee, the calculating the distances of the locations of the ingredients of the second food item to the current location of the second employee, the determining the sequence of selecting the ingredients of the second food item, and the generating and displaying the overlay to the interface for viewing in the AR headset.

9. A computer program product for generating an interface, the computer program product comprising:

one or more computer readable storage media having computer readable program code collectively stored on the one or more computer readable storage media, the computer readable program code being executed by a central processing unit (CPU) of a computer system to cause the computer system to perform a method comprising:

using a natural language processing (NLP) module, a natural language understanding (NLU) module, and one or more microphones operatively coupled to the NLP and NLU modules, and using a database that associates ingredient names with pronunciations, keywords, and recipes, the computer system deriving ingredients of a first food item from first audio data captured by the one or more microphones and received from a first spoken order of a first customer who is ordering the first food item;

the computer system determining that the first audio data includes a pronunciation of a first ingredient that is not included in the derived ingredients of the first food item and is not associated with the pronunciations associated with ingredient names by the database;

using a machine learning component and a dialect of the first customer, the computer system learning that the pronunciation of the first ingredient is associated with the first ingredient, and the computer system associating, in the database, the pronunciation of the first ingredient with a name of the first ingredient;

subsequent to the learning using the machine learning component, the computer system receiving second audio data from a second spoken order of a second customer who is ordering a second food item, the second audio data being captured by the one or more microphones;

using the NLP module and the NLU module, the computer system determining that the second audio data includes the pronunciation of the first ingredient;

using the NLP module, the NLU module, and the database, the computer system deriving ingredients of the second food item from the second audio data, wherein the deriving the ingredients includes deriving the first ingredient from the second audio data based on the database associating the pronunciation of the first ingredient with the name of the first ingredient;

using a camera, the computer system identifying locations of the ingredients of the second food item in a preparation area, the preparation area including (i) the ingredients of the second food item and (ii) other ingredients, the camera being operatively coupled to an augmented reality (AR) headset worn by a second employee who is assigned to prepare the second food item;

using image data captured by the camera, the computer system determining a current location of the second employee;

the computer system calculating distances of the locations of the ingredients of the second food item to the current location of the second employee;

based on the calculated distances, the computer system determining a sequence of selecting the ingredients of the second food item, so that the second employee selecting the ingredients of the second food item in the sequence maximizes a speed at which the second food item is prepared by the second employee; and the computer system generating and displaying an overlay to an interface for viewing in the AR headset worn by the second employee, the overlay including visual indicators overlaying an image of the preparation area, the visual indicators marking the ingredients of the second food item and the sequence of selecting the ingredients of the second food item, and distinguishing the ingredients of the second food item from the other ingredients in the preparation area.

10. The computer program product of claim 9, wherein the identifying the locations of the ingredients of the second food item in the preparation area includes identifying the ingredients of the second food item in the locations by using an image recognition module analyzing image data captured by a digital camera whose field of view includes the preparation area.

11. The computer program product of claim 9, wherein the method further comprises the computer system determining positions of the ingredients of the second food item in a fixed grid pattern that specifies locations of a set of ingredients in the preparation area, wherein the identifying the locations of the ingredients of the second food item in the preparation area is based on the positions of the ingredients of the second food item in the fixed grid pattern.

12. The computer program product of claim 9, wherein the method further comprises using the NLP and NLU modules, the computer system deriving a portion size of an ingredient included in the second spoken order, wherein the overlay further includes a visual indicator of the portion size that overlays a portion of the image that displays the ingredient.

13. The computer program product of claim 9, wherein the method further comprises:
  subsequent to the second employee completing a preparation of the second food item after the overlay is generated, the computer system receiving additional audio data from additional speech in an interaction between the second customer and the second employee, the additional speech indicating a mistake in the completed preparation of the second food item;
  the computer system monitoring a remedial action taken by the second employee to correct the mistake;
  based on the mistake and the remedial action, the computer system identifying a source of a miscommunication between the second customer and the second employee that caused the mistake; and
  the computer system sending feedback about the source of miscommunication to the machine learning component to learn from the feedback and improve an accuracy of processing a future spoken order for another food item by avoiding the miscommunication in processing the future spoken order.

14. The computer program product of claim 9, wherein the method further comprises the computer system classifying an accent or a dialect detected in the second audio data by using an accent and dialect classifier module, wherein the deriving the ingredients of the second food item from the second audio data is based on the accent or the dialect detected in the second audio data.

15. A computer system comprising:
  a central processing unit (CPU);
  a memory coupled to the CPU; and
  one or more computer readable storage media coupled to the CPU, the one or more computer readable storage media collectively containing instructions that are executed by the CPU via the memory to implement a method of generating an interface, the method comprising:
    using a natural language processing (NLP) module, a natural language understanding (NLU) module, and one or more microphones operatively coupled to the NLP and NLU modules, and using a database that associates ingredient names with pronunciations, keywords, and recipes, the computer system deriving ingredients of a first food item from first audio data captured by the one or more microphones and received from a first spoken order of a first customer who is ordering the first food item;
    the computer system determining that the first audio data includes a pronunciation of a first ingredient that is not included in the derived ingredients of the first food item and is not associated with the pronunciations associated with ingredient names by the database;
    using a machine learning component and a dialect of the first customer, the computer system learning that the pronunciation of the first ingredient is associated with the first ingredient, and the computer system associating, in the database, the pronunciation of the first ingredient with a name of the first ingredient;
    subsequent to the learning using the machine learning component, the computer system receiving second audio data from a second spoken order of a second customer who is ordering a second food item, the second audio data being captured by the one or more microphones;
    using the NLP module and the NLU module, the computer system determining that the second audio data includes the pronunciation of the first ingredient;
    using the NLP module, the NLU module, and the database, the computer system deriving ingredients of the second food item from the second audio data, wherein the deriving the ingredients includes deriving the first ingredient from the second audio data based on the database associating the pronunciation of the first ingredient with the name of the first ingredient;
    using a camera, the computer system identifying locations of the ingredients of the second food item in a preparation area, the preparation area including (i) the ingredients of the second food item and (ii) other ingredients, the camera being operatively coupled to an augmented reality (AR) headset worn by a second employee who is assigned to prepare the second food item;
    using image data captured by the camera, the computer system determining a current location of the second employee;
    the computer system calculating distances of the locations of the ingredients of the second food item to the current location of the second employee;
    based on the calculated distances, the computer system determining a sequence of selecting the ingredients of the second food item, so that the second employee selecting the ingredients of the second food item in the sequence maximizes a speed at which the second food item is prepared by the second employee; and
    the computer system generating and displaying an overlay to an interface for viewing in the AR headset worn by the second employee, the overlay including visual indicators overlaying an image of the preparation area, the visual indicators marking the ingredients of the second food item and the sequence of selecting the ingredients of the second food item, and distinguishing the ingredients of the second food item from the other ingredients in the preparation area.

16. The computer system of claim 15, wherein the identifying the locations of the ingredients of the second food item in the preparation area includes identifying the ingredients of the second food item in the locations by using an image recognition module analyzing image data captured by a digital camera whose field of view includes the preparation area.

17. The computer system of claim 15, wherein the method further comprises the computer system determining positions of the ingredients of the second food item in a fixed grid pattern that specifies locations of a set of ingredients in the preparation area, wherein the identifying the locations of the ingredients of the second food item in the preparation area is based on the positions of the ingredients of the second food item in the fixed grid pattern.

18. The computer system of claim 15, wherein the method further comprises using the NLP and NLU modules, the computer system deriving a portion size of an ingredient included in the second spoken order, wherein the overlay further includes a visual indicator of the portion size that overlays a portion of the image that displays the ingredient.

19. The computer system of claim 15, wherein the method further comprises:
  subsequent to the second employee completing a preparation of the second food item after the overlay is generated, the computer system receiving additional audio data from additional speech in an interaction between the second customer and the second employee, the additional speech indicating a mistake in the completed preparation of the second food item;
  the computer system monitoring a remedial action taken by the second employee to correct the mistake;
  based on the mistake and the remedial action, the computer system identifying a source of a miscommunication between the second customer and the second employee that caused the mistake; and
  the computer system sending feedback about the source of miscommunication to the machine learning component to learn from the feedback and improve an accuracy of processing a future spoken order for another food item by avoiding the miscommunication in processing the future spoken order.

20. The computer system of claim 15, wherein the method further comprises the computer system classifying an accent or a dialect detected in the second audio data by using an accent and dialect classifier module, wherein the deriving the ingredients of the second food item from the second audio data is based on the accent or the dialect detected in the second audio data.

\* \* \* \* \*